United States Patent
Eriksson

(10) Patent No.: US 6,263,076 B1
(45) Date of Patent: *Jul. 17, 2001

(54) ARRANGEMENT IN A SUBSCRIBER LINE INTERFACE CIRCUIT

(75) Inventor: Hans Eriksson, Järfälla (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,018

(22) Filed: Oct. 30, 1997

(30) Foreign Application Priority Data

Nov. 8, 1996 (SE) .................................... 9604099

(51) Int. Cl.$^7$ .............................. H04M 1/00; H04M 9/00
(52) U.S. Cl. ........................................... 379/399; 379/400
(58) Field of Search .................................... 379/398, 413, 379/412, 377, 29, 22, 27, 324, 24; 324/98, 725, 706; 323/365

(56) References Cited

U.S. PATENT DOCUMENTS

| | | | |
|---|---|---|---|
| 4,004,102 | | 1/1977 | Ott .......................................... 333/32 |
| 4,015,091 | * | 3/1977 | Rao et al. ............................. 379/382 |
| 4,025,729 | * | 5/1977 | Stone .................................... 379/418 |
| 4,056,693 | * | 11/1977 | Bosik et al. ........................... 379/418 |
| 4,103,114 | * | 7/1978 | Bosik ..................................... 379/412 |
| 4,894,860 | * | 1/1990 | Korsky et al. ........................ 379/398 |
| 4,947,427 | * | 8/1990 | Rosch et al. .......................... 379/412 |
| 5,193,108 | * | 3/1993 | Stocklin ................................. 379/21 |
| 5,271,059 | | 12/1993 | Dielacher et al. .................... 379/398 |
| 5,323,453 | * | 6/1994 | Arras et al. ............................ 379/400 |
| 5,329,584 | * | 7/1994 | Nagato .................................. 379/382 |
| 5,388,153 | * | 2/1995 | Burger et al. ......................... 379/164 |
| 5,422,939 | * | 6/1995 | Kramer et al. ........................ 379/377 |
| 5,440,610 | * | 8/1995 | Schillaci et al. ........................ 379/24 |
| 5,553,138 | * | 9/1996 | Heald et al. ........................... 379/413 |
| 5,604,785 | * | 2/1997 | Pryor et al. ............................. 379/29 |
| 5,608,795 | * | 3/1997 | Gay ....................................... 379/394 |
| 5,651,048 | * | 7/1997 | Leeuw .................................... 379/27 |
| 5,661,794 | * | 8/1997 | Rosch et al. .......................... 379/413 |
| 5,706,343 | * | 1/1998 | Saviotti ................................. 379/413 |
| 5,771,285 | * | 6/1998 | Wittman ................................ 379/377 |

FOREIGN PATENT DOCUMENTS 2 161858   6/1990   (JP) .

* cited by examiner

*Primary Examiner*—Stella Woo
(74) *Attorney, Agent, or Firm*—Burns, Doane, Swecker & Mathis, L.L.P.

(57) ABSTRACT

A control processor is connected to a subscriber line interface circuit to control the operating mode of the line interface circuit and monitor, via a detector output terminal of the line interface circuit, the status of the line connected to the line interface circuit. The control processor is adapted to control the line interface circuit to ensure, at a first point of time, that its detector output terminal is in a first signal state and, at that first point of time, to initiate a measurement of the line voltage. The line interface circuit is adapted, at a second point of time, to bring the detector output terminal to a second signal state after a time interval whose length in a predetermined manner is proportional to the measured line voltage, and the control processor is adapted to convert the time interval during which the detector output terminal of the line interface circuit is in the first signal state to a voltage value corresponding to the line voltage.

6 Claims, 1 Drawing Sheet

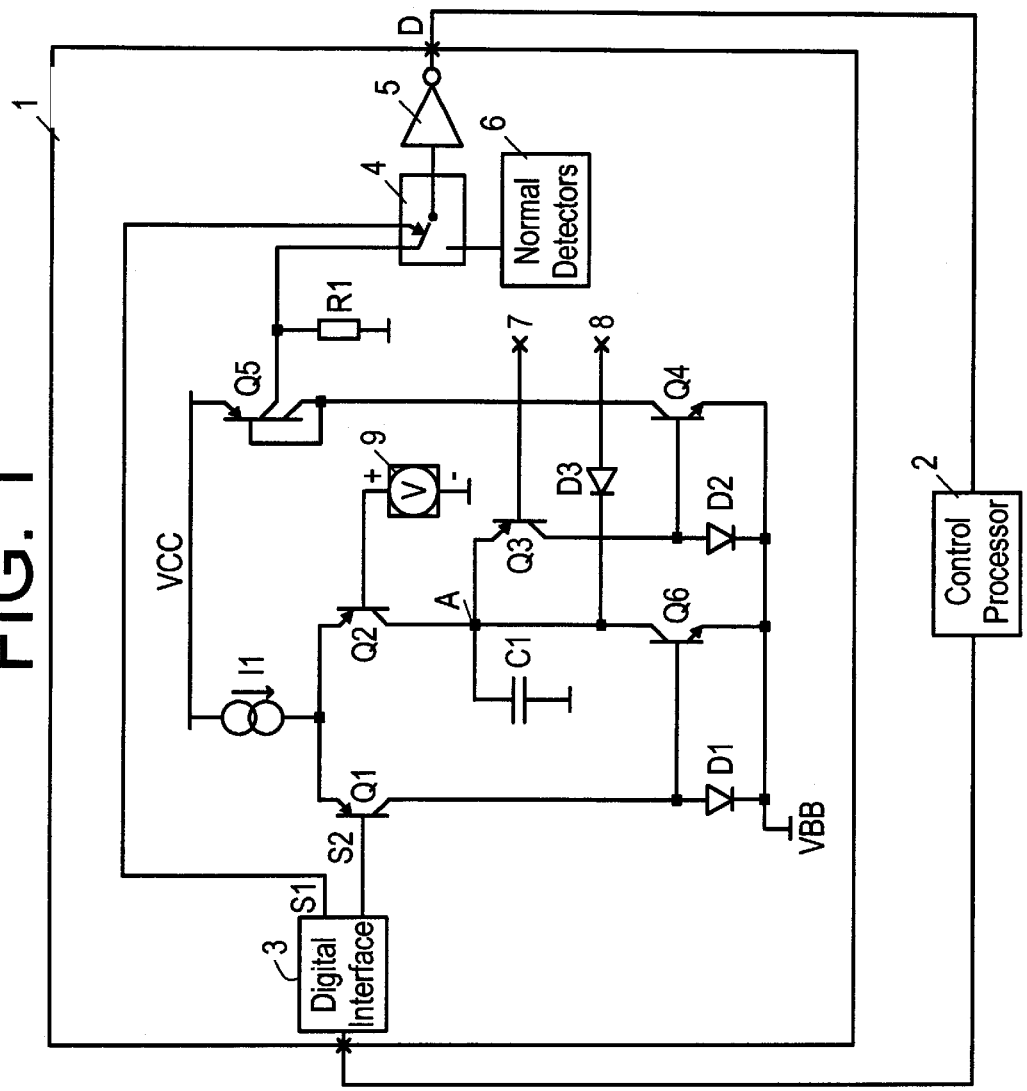

ARRANGEMENT IN A SUBSCRIBER LINE INTERFACE CIRCUIT

TECHNICAL FIELD

The invention relates generally to an arrangement for measuring the voltage across a telephone line connected to a line interface circuit.

BACKGROUND

Line interface circuits are provided on line interface boards and are controlled by a control processor on the line interface board, the control processor being common to a plurality of line interface circuits.

In order to be able to compensate for line resistance dependent attenuation on the line, the control processor needs information about the resistance of the line connected to the respective line interface circuit. A method of obtaining information about the line resistance when the current characteristic and supply voltage of the line interface circuit are known, comprises measuring the line voltage and calculating the line resistance from the measured line voltage.

To transfer the line voltage information to the control processor, either an external analog-to-digital converter or an internal analog-to-digital converter in the line interface circuit, is used today.

In the case of an external analog-to-digital converter, a separate output terminal is necessary on the line interface circuit to output an output voltage proportional to the line voltage.

With an internal analog-to-digital converter in the line interface circuit, at least one separate output terminal is needed on the line interface circuit for communication with the control processor.

SUMMARY

The object of the invention is to bring about an arrangement for line voltage measurement and, thereby, line resistance calculation which does not require any extra components or any extra output terminal.

This is attained according to the invention in that the control processor controls the detector output terminal of the line interface circuit to a first signal state at a first point of time at the same time as the line interface circuit is controlled to initiate the measurement of the line voltage. After a time interval whose length is proportional to the measured line voltage, the detector output terminal of the line interface circuit is controlled to a second signal state. The control processor is adapted to convert the time interval during which the detector output terminal of the line interface circuit is in the first signal state to a voltage value corresponding to the measured line voltage. Since the current characteristic and supply voltage of the line interface circuit are known, the control processor can calculate the line current on the basis of this voltage value and, thereby, also the line resistance.

Thus, the measurement can be carried out without any extra components or any extra output terminal, i.e. no extra wiring is needed on the line interface board.

BRIEF DESCRIPTION OF THE DRAWING

The invention will be described more in detail below with reference to the appended drawing, on which FIG. 1 shows an embodiment of an arrangement according to the invention for measuring the voltage across a line connected to a line interface circuit.

DETAILED DESCRIPTION

FIG. 1 schematically shows a line interface circuit 1 and a control processor 2 for controlling the operating mode of the line circuit 1 via a digital interface 3.

The interface 3 has two control output terminals S1 and S2 for controlling the line interface circuit 1 for measuring the voltage across the line (not shown) connected to the line interface circuit 1.

The control output terminal S1 is connected to a switch 4 for switching the switch between a lower and an upper position. Normally, the switch 4 is in its lower position in order to transfer signals to the control processor 2 via the detector output terminal D of an inverting detector output amplifier 5 from the normal detectors of the line interface circuit 1, illustrated in the form of a block 6. These detectors which do not have anything to do with the present invention, are known per se and, therefore, are not described in this connection.

When the line voltage is to be measured in accordance with the invention, the switch 4 is switched to its upper position shown in the figure in that the control output terminal S1 of the interface 3 is activated (brought to a high signal level) by the control processor 2 as will be described more in detail below.

In the embodiment shown, the control output terminal S2 of the interface 3 is connected to the base of a transistor Q1 whose collector is connected, on the one hand, to the base of a transistor Q6 and, on the other hand, to the anode of a diode D1 whose cathode is connected to a supply voltage VBB. The emitter of the transistor Q1 is interconnected with the emitter of a transmitter Q2 whose collector is connected to an interconnection node A.

A capacitor C1 is connected between the node A and ground. The node A is also connected to the emitter of a transistor Q3 whose base is adapted to sense the potential on that one of the two wires of the telephone line not shown, whose potential is intended to be closest to ground, usually denoted a-wire or tip wire, via a tip wire connection terminal 7.

The collector of the transistor Q3 is connected, on the one hand, to the anode of a diode D2 whose cathode is connected to the supply voltage VBB and, on the other hand, to the base of a transistor Q4 whose emitter is connected to the supply voltage VBB and whose collector is connected to the interconnection point between the base and one collector of a multi-collector transistor Q5. A second collector of the transistor Q5 is connected, on the one hand, via a resistor R1 to ground and, on the other hand, to the upper pole of the switch 4. The emitter of the transistor Q5 is connected to a supply voltage VCC.

Moreover, a current generator I1 is connected between the supply voltage VCC and the interconnection point between the emitters of the transistors Q1 and Q2.

The node A is, furthermore, connected to the cathode of a diode D3 whose anode is adapted to sense the voltage on the second wire, usually denoted b-wire or ring wire, of the line (not shown) connected to the line interface circuit 1 via a ring wire connection terminal 8. The b-wire (not shown), is the wire whose potential is intended to be closest to the supply voltage VBB.

Finally, the node A is connected to the collector of the transistor Q6 whose emitter is connected to the supply voltage VBB and whose base, as above, is connected to the interconnection point between the collector of the transistor Q1 and the anode of the diode D1.

The base of the transistor Q2 is connected to a DC source 9.

Normally, the base of the transistor Q1 is at a signal level which is lower than the signal level at the base of the transistor Q2, i.e. the transistor Q1 is normally conducting, while the transistor Q1 is cut off. Thus, the current from the current generator I1 normally flows through the transistor Q1 and the diode D1. This current is mirrored to the collector of the transistor Q6 and will be drawn through the diode D3 in such a manner that the voltage in the node. A will be a diode voltage drop of the diode D3 below the voltage of the ring wire (not shown), i.e. the voltage of the ring wire connection terminal 8.

Thus, the capacitor C1 will normally be charged to this voltage.

To measure the line voltage across the line (not shown) connected to the connection terminals 7 and 8, the control processor 2 is adapted to apply to the base of the transistor Q1 via the control output terminal S2 of the interface 3, a signal level which is high in comparison with the signal level that the DC source 9 applies to the base of the transistor Q2.

This point of time is registered by the control processor 2 as a starting point of time for the measurement.

At the same time, the control output terminal S1 of the interface 3 is activated, bringing the switch 4 to its position illustrated in the figure. Hereby, the input terminal of the amplifier 5 is grounded via the resistor R1. Therefore, the signal level on the output terminal of the amplifier 5 will be low. Since the amplifier 5 is inverting, the signal level will be high on the output terminal D which ensures that the signal level on the terminal D will be high irrespective of its previous signal level.

When the signal level on the base of the transistor Q1 is higher than the signal level on the base of the transistor Q2, the transistor Q1 is cut off while the transistor Q2 becomes conducting. The current from the current generator I1 will instead flow through the transistor Q2 and start to recharge the capacitor C1.

When the voltage across the capacitor C1, i.e. the voltage in the node A, reaches such a value relative to the voltage on the base of the transistor Q3, i.e. the voltage on the tip wire connection terminal 7, that the transistor Q3 starts to conduct, the current from the current generator I1 will flow through the transistor Q3 and the diode D2. This current is mirrored to the collector of the transistor Q4. The collector current of the transistor Q4 is drawn from the collector interconnected with the base of the transistor Q5 and is mirrored to the second collector of the multi-collector transistor Q5. Thus, the current flows through the resistor R1 and causes a voltage across this resistor. The voltage across the resistor R1 is coupled via the switch 4 in its illustrated position to the input terminal of the amplifier 5 which causes the signal level to become low on the output of the amplifier 5. That the signal level on the output terminal D goes low is registered by the control processor 2 as the ending point of time for the measurement.

Thus, the detector output terminal D of the line interface circuit 1 goes low after a time interval corresponding to the time it took to recharge the capacitor C1. During this time interval, the capacitor C1 has been recharged to a voltage which is proportional to the voltage across the line (not shown) connected to the tip and ring wire connection terminals 7 and 8, respectively.

The control processor 2 is adapted to measure this time interval whose length is proportional to the line voltage. Based on the calculated voltage value, the control processor 2 is adapted to calculate the line current since the current characteristic and supply voltage of the line interface circuit are known. From the line current value, the control processor is adapted to calculate the line resistance.

What is claimed is:

1. An arrangement for determining a line resistance of a line comprising a tip wire and a ring wire connected to a line interface circuit to which a control processor is connected, the control processor being adapted to control the line interface circuit and monitor a status of a line via a detector output terminal of the line interface circuit to determine the line resistance, the control processor is further adapted at a first point of time to control the line interface circuit to ensure that the detector output terminal is in a first signal state and to initiate charging of a capacitor normally charged to a voltage corresponding to the voltage of the ring wire.

the line interface circuit is adapted to bring the detector output terminal to a second signal state when the capacitor has been charged to a voltage corresponding to the voltage of the tip wire and the capacitor is connected to the tip wire when the voltage of the capacitor corresponds to the voltage of the tip wire, and the control processor is further adapted to measure the time interval between the first point of time and the time when the detector output terminal is brought to the second signal state, convert the measured time interval to a voltage value corresponding to the line voltage, calculate the line resistance from that voltage value, and, in response to the calculated line resistance, control the line interface circuit to compensate for line resistance dependent attenuation on the line.

2. An arrangement for determining a line resistance of a telephone line having a tip wire and a ring wire, comprising:

a line interface circuit and a control processor connected to the line interface circuit, the control processor being adapted to control the line interface circuit and monitor a status of a telephone line via a detector output terminal of the line interface circuit to determine the line resistance, wherein the line interface circuit includes:

a digital interface adapted to receive a control signal from the control processor and generate an output signal in response to the control signal, wherein the output signal has a first state and a second state;

a current generator;

a first transistor connected to the current generator and adapted to receive the output signal from the digital interface, wherein the first transistor conducts current from the current generator if the output signal is in the first state and the first transistor does not conduct current if the output signal is in the second state;

a second transistor connected to the current generator, wherein the second transistor conducts current from the current generator if the first transistor is not conducting current and the second transistor does not conduct current when the first transistor conducts current;

a capacitor connected to the second transistor, such that current conducted by the second transistor increases a charge stored by the capacitor; and a third transistor connected to the tip wire and to the capacitor such that the third transistor causes a signal monitored by the control processor to change when the increase in charge stored by the capacitor corresponds to a difference between the voltage on the tip wire compared to the voltage on the ring wire, wherein the control processor begins to measure a duration of time and generates a control signal which causes the digital interface to produce an output signal in the second state and the control processor stops measuring the duration of time in response to the third transistor causing a change in the signal monitored by the control processor.

3. The arrangement of claim 2, wherein the first transistor is a PNP-type transistor having its emitter connected to the current generator and its base connected to the digital interface.

4. The arrangement of claim 2, wherein the second transistor is a PNP-type transistor having its emitter connected to the current generator, its collector connected to the capacitor, and its base connected to a voltage source.

5. The arrangement of claim 4, wherein the first state of the output signal is first voltage, the second state of the output signal is a second voltage, and the voltage of the voltage source is between the first voltage and the second voltage.

6. The arrangement of claim 2, wherein the third transistor is a PNP-type transistor having its emitter connected to the capacitor and the base connected to the tip wire.

* * * * *